(12) United States Patent
Cao et al.

(10) Patent No.: US 11,581,587 B2
(45) Date of Patent: Feb. 14, 2023

(54) DISCHARGE ENERGY RECOVERY AND FORMATION CAPACITY GRADING APPARATUS FOR SOFT-PACKAGE POWER BATTERY

(71) Applicant: ZHEJIANG HANGKE TECHNOLOGY INCORPORATED COMPANY, Hangzhou (CN)

(72) Inventors: Ji Cao, Hangzhou (CN); Zheng Cao, Hangzhou (CN); Qingyuan Cai, Hangzhou (CN)

(73) Assignee: ZHEJIANG HANGKE TECHNOLOGY INCORPORATED COMPANY, Hangzhou (CN)

( * ) Notice: Subject to any disclaimer, the term of this patent is extended or adjusted under 35 U.S.C. 154(b) by 595 days.

(21) Appl. No.: 16/633,165

(22) PCT Filed: Sep. 19, 2019

(86) PCT No.: PCT/CN2019/106557
§ 371 (c)(1),
(2) Date: Jan. 23, 2020

(87) PCT Pub. No.: WO2020/103552
PCT Pub. Date: May 28, 2020

(65) Prior Publication Data
US 2021/0210801 A1    Jul. 8, 2021

(30) Foreign Application Priority Data
Nov. 22, 2018 (CN) .......................... 201811398265.6

(51) Int. Cl.
*H01M 10/44*    (2006.01)
*H01M 10/42*    (2006.01)
*H02J 7/00*     (2006.01)

(52) U.S. Cl.
CPC ..... *H01M 10/441* (2013.01); *H01M 10/4285* (2013.01); *H01M 10/446* (2013.01);
(Continued)

(58) Field of Classification Search
CPC .......................... H01M 10/441; H02J 7/0042
(Continued)

(56) References Cited

U.S. PATENT DOCUMENTS

| 11,360,153 B1* | 6/2022 | Wang ................... G01R 31/396 |
| 2019/0036358 A1* | 1/2019 | Liang ................... H01M 10/44 |

(Continued)

FOREIGN PATENT DOCUMENTS

| CN | 104953184 A | 9/2015 |
| CN | 105070950 A | 11/2015 |

(Continued)

OTHER PUBLICATIONS

European search report issued in corresponding International application No. PCT/CN2019/106557, dated Jun. 9, 2022.

*Primary Examiner* — Suchin Parihar

(57) ABSTRACT

A discharge energy recovery and formation capacity grading apparatus for a soft-package power battery comprises a rack, a condition-variable charge and discharge power box arranged on the rack, a battery formation capacity-grading clamping movement mechanism for clamping positive and negative electrode lugs of the soft-package power battery, a battery tray for, a movement mechanism control assembly for controlling the movement of the battery formation and capacity grading clamping movement mechanism, a safety protection sensor assembly, and a battery formation capacity-grading control mechanism. The charge and discharge (Continued)

power box, the battery formation capacity-grading clamping movement mechanism, the battery tray, the movement mechanism control assembly, and the safety protection sensor assembly are all in signal connection with the battery formation capacity-grading control mechanism. The power transmission end of the charge and discharge power box is electrically connected with the power transmission end of the battery formation capacity-grading clamping movement mechanism.

9 Claims, 9 Drawing Sheets

(52) U.S. Cl.
CPC .......... *H02J 7/0029* (2013.01); *H02J 7/0042* (2013.01); *H02J 7/0047* (2013.01); *H02J 2207/20* (2020.01)

(58) Field of Classification Search
USPC .......................................................... 320/128
See application file for complete search history.

(56) References Cited

U.S. PATENT DOCUMENTS

| | | | |
|---|---|---|---|
| 2019/0154760 A1* | 5/2019 | Zhao | H01M 10/42 |
| 2020/0152960 A1* | 5/2020 | Grunwald | H01M 10/446 |
| 2021/0210797 A1* | 7/2021 | Cao | H01M 10/446 |
| 2021/0210800 A1* | 7/2021 | Cao | H01M 10/0587 |
| 2021/0210801 A1* | 7/2021 | Cao | H01M 10/0585 |

FOREIGN PATENT DOCUMENTS

| | | |
|---|---|---|
| CN | 204760497 U | 11/2015 |
| CN | 109546246 A | 3/2019 |
| DE | 102017203957 A1 | 9/2018 |
| KR | 20110004006 A | 1/2011 |

* cited by examiner

DISCHARGE ENERGY RECOVERY AND FORMATION CAPACITY GRADING APPARATUS FOR SOFT-PACKAGE POWER BATTERY

TECHNICAL FIELD

The present invention relates to the technical field of lithium ion battery manufacturing, and particularly to a discharge energy recovery and formation capacity grading apparatus for a soft-package power battery.

BACKGROUND

Soft-package power batteries are a kind of lithium-ion batteries. Compared with liquid lithium batteries, they have many obvious advantages such as high energy density, small size, ultra-thinness, light weight, and high safety, thus being a new type of batteries. In the production process of soft-package lithium-ion batteries, formation and capacity grading are important procedures. The formation is the activation of the internal activity of the battery by electrical energy to form an SEI film on the negative electrode of the battery. A high-quality formation apparatus can ensure that the battery has good charge and discharge performance and cycle life. Capacity grading includes performing several full-load charge and discharge cycles on the activated batteries, to test the internal AC/DC resistance, the charge and discharge voltage, the constant-current discharge, constant-voltage discharge, and constant-power discharge curves, and grouping to select the batteries having the same electrical parameters for use after serial or parallel connection, thereby reducing the Buckets effect of the batteries after combination.

SUMMARY

To overcome the shortcomings of inadaptability to simultaneous production of batteries of various sizes, inadaptability to simultaneous production of batteries of single-sided lugs and double-sided lugs, and low batch-production efficiency existing in current formation and capacity grading procedures of soft-package power batteries, the present invention provides a discharge energy recovery and formation capacity grading apparatus for a soft-package power battery, which is easy to operate, has high safety, and is adaptable to the simultaneous production of batteries of various sizes.

The discharge energy recovery and formation capacity grading apparatus for a soft-package power battery according to the present invention comprises a rack, a condition-variable charge and discharge power box arranged on the rack, a battery formation capacity-grading clamping movement mechanism for clamping positive and negative electrode lugs of the soft-package power battery, a battery tray for placing the soft-package power battery, a movement mechanism control assembly for controlling the movement of the battery formation capacity-grading clamping movement mechanism, a safety protection sensor assembly, and a battery formation capacity-grading control mechanism, where the condition-variable charge and discharge power box, the battery formation capacity-grading clamping movement mechanism, the battery tray, the movement mechanism control assembly, and the safety protection sensor assembly are all in signal connection with the battery formation capacity-grading control mechanism; and a power transmission end of the charge and discharge power box is electrically connected with a power transmission end of the battery formation capacity-grading clamping movement mechanism.

The charge and discharge power box comprises a power chassis, an electronic circuit, at least one drive power board, a DSP control board, an auxiliary working power, a power inverter with bidirectional flow and conversion capability between AC and DC, a safety protection control assembly and an interface communication board, where the electronic circuit, the drive power board, the DSP control board, the auxiliary working power, and the power inverter are all arranged in the power chassis; the electronic circuit, the drive power board, the auxiliary working power and are respectively connected to the DSP control board; the DSP control board is in bidirectional signal connection with the battery formation capacity-grading control mechanism via the interface communication board; and a signal transmission end of the drive power board is in signal connection with a signal transmission port of the power inverter.

The electronic circuit comprises a DC/DC power supply enabling bidirectional current flow for charging and discharging a single-cell lithium ion battery, a safety protection reference resistor, a charge and discharge constant-current control loop subjected to precise control, a charge and discharge constant-voltage control loop, and a main-reference and fine-tune-reference combiner circuit.

The drive power board comprises a multi-channel PWM DC/DC control module, a MOS power tube and heat sink, a DC/DC transformer, a capacitor, an inductor, and a drive power board cooling fan, where the multi-channel PWM DC/DC control module is in signal connection respectively with the MOS power tube and heat sink, the DC/DC transformer, the capacitor, the inductor, and the drive power board cooling fan; and connection ports of the power inverter are respectively electrically connected to the power grid and an input of the multi-channel PWM DC/DC control module to convert the current from the power grid from AC to DC to charge the battery or to convert the discharge current of the battery from DC to AC to feed back to the power grid, that is, when the battery is charged, the circuitry of the drive power board obtains the current AC/DC from the power inverter; and when the battery is discharged, the circuitry of the drive power board feeds the current DC/AC to the power inverter, thereby creating a function of energy recovery from the discharge circuitry.

The power inverter comprises a casing, a power input and output terminal block, a programmed status button, a working status indicator, a DSP chip board, an IGBT main power module, an IGBT power tube assembly, a power control circuit assembly, and a filter inductor, wherein the power input and output terminal block, the programmed status button, and the working status indicator are all mounted on the surface of an operation area of the casing; the DSP chip board, the IGBT main power module, the IGBT power tube assembly, the power control circuit assembly, and the filter inductor are arranged inside the casing; corresponding signal transmission ports of the DSP chip board are respectively electrically connected to the programmed button, the IGBT main power module, the IGBT power tube assembly, the power control circuit assembly, and the filter inductor; a power input and output of the DSP chip board are electrically connected to the power grid via the power input and output terminal block; a signal input and output of the DSP chip board are electrically connected to an input of the multi-channel PWM DC/DC control module; and a signal indication output of the DSP chip board is electrically connected to the working status indicator, for indicating the working status of the power inverter.

The battery formation capacity-grading clamping movement mechanism comprises a planar aluminum plate; and lug clamps for clamping the positive and negative electrode lugs of the lithium ion battery, a battery tray enclasping cylinder member for enclasping and locking position of the battery tray, a lug clamp compressing cylinder member for bring the electrode lug of the battery into contact connection with the lug clamp, a battery tray holder for supporting the battery tray, a horizontally moving cylinder member of the lug clamp compressing member for moving the lug clamp to the position of the electrode lug of the battery, a bundled wire member, and a pneumatic control member coupled to the battery formation capacity-grading control mechanism, arranged on the planar aluminum plate, where the planar aluminum plate is horizontally disposed, two horizontally moving cylinder members are symmetrically arranged on the planar aluminum plate, movable ends of the two horizontally moving cylinder members are allowed to move in a direction facing or facing away from each other, the movable end of each of the horizontally moving cylinder member is fitted with the lug clamp compressing cylinder member, and a movable end of the lug clamp compressing cylinder member moves in a direction perpendicular to the direction of movement of the movable end of the horizontally moving cylinder member; a side of the lug clamp compressing cylinder member facing the battery tray holder is mounted with the lug clamp, and the lug clamp is capable of being axially compressed or stretched along the lug clamp compressing cylinder member, to achieve the compression of the electrode lug of the battery and the lug clamp while the two are in contact connection; the battery tray holder is arranged on the planar aluminum plate between the two lug clamps, and the battery tray holder is provided with the battery tray enclasping cylinder member; the lug clamp, the battery tray enclasping cylinder member, the lug clamp compressing cylinder member, the horizontally moving cylinder member of the lug clamp compressing member, and the bundled wire member are all in signal connection with a signal output of the pneumatic control member, and a signal input of the pneumatic control member is in signal connection with a corresponding signal output of the battery formation capacity-grading control mechanism, to achieve the control of the lug clamp, the battery tray enclasping cylinder member, the lug clamp compressing cylinder member, the horizontally moving cylinder member of the lug clamp compressing member, and the bundled wire member by the pneumatic control member, and the bundled wire member is electrically connected to the drive power board of the charge and discharge power box.

The battery tray comprises a base, an outer frame, and a tray lining, in which a bottom of the outer frame is fixed to the base, such that the outer frame and the base enclose a cavity for holding the soft-package lithium battery; two opposite sides of the outer frame are provided a hole for extending the electrode lug of the soft-package lithium battery out; the tray lining is laid on the surface of the base, and the surface of the tray lining is provided with a plurality of sites for placement of the soft-package power battery that match the shape and size of the soft-package power battery; the soft-package power battery is vertically positioned at the sites for placement, and the electrode lugs of the soft-package power battery is ensured to fit with the lug clamps of the battery formation capacity-grading clamping movement mechanism after extending out from the left and right sides.

An ID number for process management of the soft pack power battery is provided on the base of the battery tray.

The safety protection sensor assembly comprises a smoke alarm sensor mounted on the top of the battery formation capacity-grading clamping movement mechanism, a position thru-beam sensor for detecting the entry status of the battery tray and indicating the battery tray enclasping cylinder member to motion when the battery tray is in a right position, and a temperature sensor for detecting the temperature of the battery at the perimeter of the battery tray, where a signal output of the smoke alarm sensor, a signal output of the temperature sensor, and a signal output of the position thru-beam sensor are in signal connection respectively with a corresponding signal output of the battery formation capacity-grading control mechanism.

The battery tray is fed to the formation capacity grading apparatus by a logistics loading mechanism, and then the apparatus will detect the entry of the tray automatically. After the entry of the tray is confirmed, the tray positioning mechanism is activated. After the position is confirmed, the left and right clamping mechanisms move to approach the battery in the middle, and the clamps will automatically clamp the electrode lugs of the battery after the clamping mechanisms are in place. After the electrode lugs are confirmed to be clamped, a charge and discharge process is automatically started. In this process, position confirmation by a sensor is provided in each step, and the battery tray is automatically fed to a next procedure after the process is completed. The both clamp compressing mechanisms are fitted with an upper and lower layer of lug clamps on the side facing the battery tray holder, for adapting to batteries of single-sided lugs and double-sided lugs.

The surface of the tray lining of the battery tray is provided with several sites for placement of the soft-package power battery that match the shape and size of the soft-package power battery; and the number of batteries placed can be changed by replacing the tray lining, which may be for example, 20, 25, 36, 48, and 64, etc. The soft-package power battery is vertically positioned at the sites for placement, and the electrode lugs extend out to fit with the lug clamps of the clamping movement mechanism. The battery tray is a molded stackable circulating box of flame retardant material. The electrode lugs of the battery extend out through the left and right holes of the tray to fit with the lug clamps of the battery formation capacity-grading clamping movement mechanism.

The charge current, discharge current, maximum charge voltage, discharge cut-off voltage, and charge and discharge time of the battery are controlled by the battery formation capacity-grading control mechanism over the power converter. The battery formation capacity-grading control mechanism, specially controlled by a chief controller, sets the formation capacity-grading conditions for the lithium ion battery and sends them to the DSP control board in the charge and discharge power box. Then the DSP control board executes the process constraint conditions of charge and discharge time limit, voltage limit, and current limit, collects the voltage and current signals from each battery, and transmits the signal data to the battery formation capacity-grading control mechanism. Special control software for the battery formation capacity-grading control mechanism analyzes and saves the received data, to form a lithium ion battery formation capacity-grading database. Such data is used as a basis for determining battery performance. One battery formation capacity-grading control mechanism can process data for many batteries simultaneously.

The safety protection sensor assembly comprises a smoke alarm sensor, a position thru-beam sensor for detecting the entry status of the battery tray and indicating the battery tray enclasping cylinder member to motion when the battery tray is in a right position, and a temperature sensor for detecting the temperature of the battery inside the battery tray, mounted over the top of the battery formation capacity-grading clamping movement mechanism. The smoke alarm sensor, the position thru-beam sensor, and the temperature sensor are all provided on the rack over the top of the capacity-grading clamping movement mechanism. Each tray corresponds to two smoke alarm sensors, position thru-beam sensors, and temperature sensors.

The position thru-beam sensors are arranged on the same horizontal level opposing each other, and are kept to correlate with each other. Through the transmission of abnormal signals, the function of stopping the operation, alarming, and cutting off the power of the apparatus during abnormal operation can be realized.

The position thru-beam sensor includes a battery tray entry status sensor, a tray position confirmation sensor, a clamping mechanism in-position sensor, and a clamp clamping sensor.

The special control software for formation capacity grading enables transmission in the battery formation capacity-grading control mechanism via a specific communication interface. The system works in a master-slave mode and is suitable for a distributed control network system.

The software for formation capacity-grading has a time limit, voltage limit, and current limit condition for termination of each process step. The charge mode can be selected from constant-current charge, constant-voltage charge, constant-current discharge, and sleep. The charge and discharge current is set between 10 A and 150 A, the charge and discharge voltage is set between 0.5 V and 5 V, the time of each step can be set, and a dynamic curve of the formation capacity grading process for each battery can be drawn in real time, including a voltage/time line, a current/time curve, a capacity/time curve, and an energy/time curve, and a list of data can be formed to enable the capacity grading.

The beneficial effects of the invention are as follows: The apparatus allows the formation and capacity grading process of soft-packed lithium batteries to be done in the same apparatus, or the formation or capacity grading process to be done exclusively and specially, and is adaptable to the production of batteries of various sizes and batteries of single-sided lugs and double-sided lugs, thereby simplifying the apparatus. Moreover, the apparatus is adaptable to multi-layer stacked battery trays, and more adaptable to battery trays put by a stacker, thereby improving the automatic production efficiency. The apparatus has good maintainability and adaptability, and has the function of discharge energy recovery to save energy and reduce the overall heat generation of the apparatus.

DESCRIPTION OF THE EMBODIMENTS

Figure 1A:
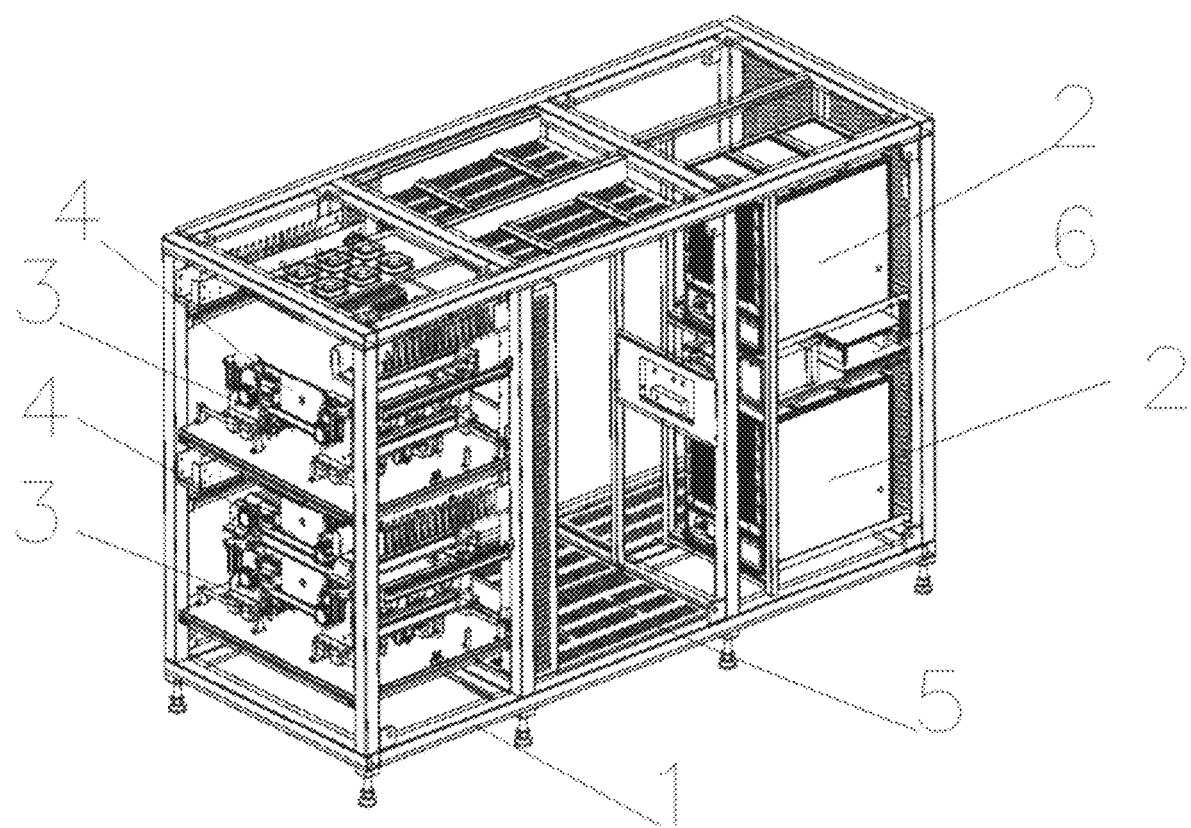
FIG. 1a is a first schematic diagram showing a front and back pattern of the overall structure of a soft-package power battery formation capacity grading apparatus according to the present invention.

The present invention will be further described below with reference to the accompanying drawings.
Referring to the accompanying drawings:

Embodiment 1

The discharge energy recovery and formation capacity grading apparatus for a soft-package power battery according to the present invention comprises a rack 1, a condition-variable charge and discharge power box 2 arranged on the rack, a battery formation capacity-grading clamping movement mechanism 3 for clamping positive and negative electrode lugs of the soft-package power battery, a battery tray 4 for placing the soft-package power battery, a movement mechanism control assembly for controlling the movement of the battery formation capacity-grading clamping movement mechanism, a safety protection sensor assembly 6, and a battery formation capacity-grading control mechanism, where the condition-variable charge and discharge power box 2, the battery formation capacity-grading clamping movement mechanism 3, the battery tray 4, the movement mechanism control assembly, and the safety protection sensor assembly 6 are all in signal connection with the battery formation capacity-grading control mechanism; and a power transmission end of the charge and discharge power box 2 is electrically connected with a power transmission end of the battery formation capacity-grading clamping movement mechanism 3.

The charge and discharge power box 2 includes a power chassis 21, an electronic circuit, at least one drive power board 23, a DSP control board 22, an auxiliary working power 26, a power inverter 24 with bidirectional flow and conversion capability between AC and DC, and an interface communication board 25, where the electronic circuit, the drive power board 23, the DSP control board 22, the auxiliary working power 26, and the power inverter 24 are all arranged in the power chassis 21, the electronic circuit, the drive power board 23, and the auxiliary working power 26 are respectively connected to the DSP control board 22; the DSP control board 22 is in bidirectional signal connection with the battery formation capacity-grading control mechanism via the interface communication board 25; and a signal transmission end of the drive power board 23 is in signal connection with a signal transmission port of the power inverter 24.

The electronic circuit comprises a DC/DC power supply enabling bidirectional current flow for charging and discharging a single-cell lithium ion battery, a safety protection reference resistor, a charge and discharge constant-current control loop subjected to precise control, a charge and discharge constant-voltage control loop, and a main-reference and fine-tune-reference combiner circuit.

The drive power board 23 comprises a multi-channel PWM DC/DC control module 231, a MOS power tube and heat sink 232, a DC/DC transformer 233, a capacitor 234, an inductor 235, and a drive power board cooling fan 236, where the multi-channel PWM DC/DC control module 231 is in signal connection with the MOS power tube and heat sink 232, the DC/DC transformer 233, the capacitor 234, the inductor 235, and the drive power board cooling fan 236 respectively; and connection ports of the power inverter 24 are respectively electrically connected to the power grid and an input of the multi-channel PWM DC/DC control module 231 to convert the current from the power grid from AC to DC to charge the battery or to convert the discharge current of the battery from DC to AC to feed back to the power grid, that is, when the battery is charged, the circuitry of the drive power board obtains the current AC/DC from the power inverter, and when the battery is discharged, the circuitry of the drive power board feeds the current DC/AC to the power inverter, thereby creating a function of energy recovery from the discharge circuitry.

The power inverter 24 comprises a casing 241, a power input and output terminal block 242, a programmed status button 243, a working status indicator 244, a DSP chip board 246, an IGBT main power module 247, an IGBT power tube assembly 248, a power control circuit assembly 249, and a filter inductor 245, where the power input and output terminal block 242, the programmed status button 243, and the working status indicator 244 are all mounted on the surface of an operation area of the casing 241; the DSP chip board 246, the IGBT main power module 247, the IGBT power tube assembly 248, the power control circuit assembly 249, and the filter inductor 245 are arranged inside the casing 241; corresponding signal transmission ports of the DSP chip board 246 are respectively electrically connected to the programmed button 243, the IGBT main power module 247, the IGBT power tube assembly 248, the power control circuit assembly 249, and the filter inductor 245, a power input and output of the DSP chip board 246 are electrically connected to the power grid via the power input and output terminal block 242; a signal input and output of the DSP chip board 246 are electrically connected to an input of the multi-channel PWM DC/DC control module 231; and a signal indication output of the DSP chip board 246 is electrically connected to the working status indicator 244, for indicating the working status of the power inverter.

The battery formation capacity-grading clamping movement mechanism 3 comprises a planar aluminum plate 31; and lug clamps 38 for clamping the positive and negative electrode lugs of the lithium ion battery, a battery tray enclasping cylinder member 32 for enclasping and locking position of the battery tray, a lug clamp compressing cylinder member 33 for bring the electrode lug of the battery into contact connection with the lug clamp, a battery tray holder 34 for supporting the battery tray, a horizontally moving cylinder member 35 of the lug clamp compressing member for moving the lug clamp to the position of the electrode lug of the battery, a bundled wire member 36, and a pneumatic control member 37 coupled to the battery formation capacity-grading control mechanism, arranged on the planar aluminum plate, where the planar aluminum plate 31 is horizontally disposed on the rack, two horizontally moving cylinder members 35 are symmetrically arranged on the planar aluminum plate 31, movable ends of the two horizontally moving cylinder members are allowed to move in a direction facing or facing away from each other, the movable end of each of the horizontally moving cylinder member 35 is fitted with the lug clamp compressing cylinder member, and a movable end of the lug clamp compressing cylinder member 33 moves in a direction perpendicular to the direction of movement of the movable end of the horizontally moving cylinder member; a side of the lug clamp compressing cylinder member 33 facing the battery tray holder is mounted with the lug clamp, and the lug clamp 38 is capable of being axially compressed or stretched along the lug clamp compressing cylinder member, to achieve the compression of the electrode lug of the battery and the lug clamp while the two are in contact connection; the battery tray holder 34 is arranged on the planar aluminum plate 31 between the two sets of lug clamps, and the battery tray holder 34 is provided with the battery tray enclasping cylinder member 32, the lug clamp 38, the battery tray enclasping cylinder member 32, the lug clamp compressing cylinder member 33, the horizontally moving cylinder member 35 of the lug clamp compressing member, and the bundled wire member 36 are all in signal connection with a signal output of the pneumatic control member 37, and a signal input of the pneumatic control member 37 is in signal connection with a corresponding signal output of the battery formation capacity-grading control mechanism, to achieve the control of the lug clamp 38, the battery tray enclasping cylinder member 32, the lug clamp compressing cylinder member 33, the horizontally moving cylinder member 35 of the lug clamp compressing member, and the bundled wire member 36 by the pneumatic control member; and the bundled wire member is electrically connected to the drive power board of the charge and discharge power box.

The battery tray 4 comprises a base 41, an outer frame 45, and a tray lining 42, in which a bottom of the outer frame 45 is fixed to the base 41, such that the outer frame 45 and the base 41 enclose a cavity for holding the soft-package lithium battery; two opposite sides of the outer frame 45 are provided with a hole for extending the electrode lug 44 of the soft-package lithium battery 43 out; the tray lining 42 is laid on the surface of the base 41, and the surface of the tray lining 42 is provided with a plurality of sites for placement of the soft-package power battery that match the shape and size of the soft-package power battery; the soft-package power battery 43 is vertically positioned at the sites for placement, and the electrode lugs of the soft-package power battery is ensured to fit with the lug clamps of the battery formation capacity-grading clamping movement mechanism after extending out from the left and right sides.

An ID number for process management of the soft pack power battery is provided on the base 41 of the battery tray.

The safety protection sensor assembly 6 comprises a smoke alarm sensor 61 mounted on the top of the battery formation capacity-grading clamping movement mechanism, a position thru-beam sensor 62 for detecting the entry status of the battery tray and indicating the battery tray enclasping cylinder member to motion when the battery tray is in a right position, and a temperature sensor 63 for detecting the temperature of the battery at the perimeter of the battery tray, where the smoke alarm sensor, the position thru-beam sensor, and the temperature sensor are all provided on the rack over the top of the capacity-grading clamping movement mechanism; and a signal output of the smoke alarm sensor, a signal output of the temperature sensor, and a signal output of the position thru-beam sensor are in signal connection respectively with a corresponding signal output of the battery formation capacity-grading control mechanism.

The battery tray is fed to the formation capacity grading apparatus by a logistics loading mechanism, and then the apparatus will detect the entry of the tray automatically. After the entry of the tray is confirmed, the tray positioning mechanism is activated. After the position is confirmed, the left and right clamping mechanisms move to approach the battery in the middle, and the clamps will automatically clamp the electrode lugs of the battery after the clamping mechanisms are in place. After the electrode lugs are confirmed to be clamped, a charge and discharge process is automatically started. In this process, position confirmation by a sensor is provided in each step, and the battery tray is automatically fed to a next procedure after the process is completed. The both clamp compressing mechanisms are fitted with an upper and lower layer of lug clamps on the side facing the battery tray holder, for adapting to batteries of single-sided lugs and double-sided lugs.

The surface of the tray lining of the battery tray is provided with several sites for placement of the soft-package power battery that match the shape and size of the soft-package power battery; and the number of batteries placed can be changed by replacing the tray lining, which may be for example, 20, 25, 36, 48, and 64, etc. The soft-package power battery is vertically positioned at the sites for placement, and the electrode lugs extend out to fit with the lug clamps of the clamping movement mechanism. The battery tray is a molded stackable circulating box of flame retardant material. The electrode lugs of the battery extend out through the left and right holes of the tray to fit with the lug clamps of the battery formation capacity-grading clamping movement mechanism.

The charge current, discharge current, maximum charge voltage, discharge cut-off voltage, and charge and discharge time of the battery are controlled by the battery formation capacity-grading control mechanism over the power converter. The battery formation capacity-grading control mechanism, specially controlled by a chief controller, sets the formation capacity-grading conditions for the lithium ion battery and sends them to the DSP control board in the charge and discharge power box. Then the DSP control board executes the process constraint conditions of charge and discharge time limit, voltage limit, and current limit, collects the voltage and current signals from each battery, and transmits the signal data to the battery formation capacity-grading control mechanism. Special control software for the battery formation capacity-grading control mechanism analyzes and saves the received data, to form a lithium ion battery formation capacity-grading database. Such data is used as a basis for determining battery performance. One battery formation capacity-grading control mechanism can process data for many batteries simultaneously.

The safety protection sensor assembly comprises a smoke alarm sensor, a battery tray entry status sensor, a tray position confirmation sensor, a clamping mechanism in-position sensor, and a clamp clamping sensor, and a temperature sensor for detecting the temperature of the battery inside the battery tray, mounted over the top of the battery formation capacity-grading clamping movement mechanism. Through the transmission of abnormal signals, the function of stopping the operation, alarming, and cutting off the power of the apparatus during abnormal operation can be realized.

The special control software for formation capacity grading enables transmission in the battery formation capacity-grading control mechanism or in a single chip microcomputer via a specific communication interface. The system works in a master-slave mode and is suitable for a distributed control network system.

The software for formation capacity-grading has a time limit, voltage limit, and current limit condition for termination of each process step. The charge mode can be selected from constant-current charge, constant-voltage charge, constant-current discharge, and sleep. The charge and discharge current is set between 10 A and 150 A, the charge and discharge voltage is set between 0.5V and 5 V, the time of each step can be set, and a dynamic curve of the formation capacity grading process for each battery can be drawn in real time, including a voltage/time line, a current/time curve, a capacity/time curve, and an energy/time curve, and a list of data can be formed to enable the capacity grading.

Embodiment 2

Figure 1B:
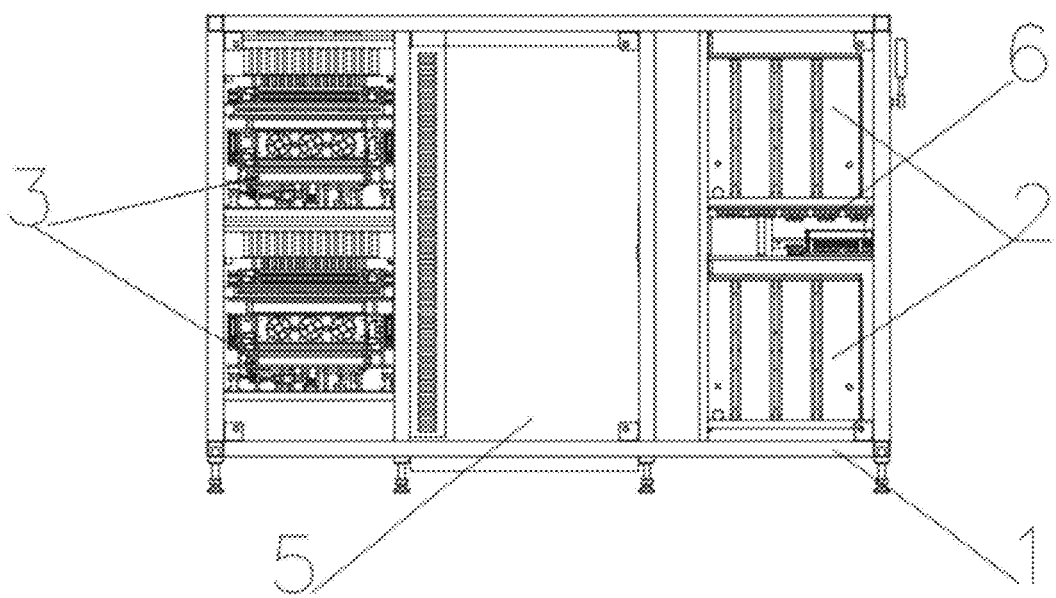
FIG. 1b is a second schematic diagram showing a front and back pattern of the overall structure of a soft-package power battery formation capacity grading apparatus according to the present invention.
Figure 1C:
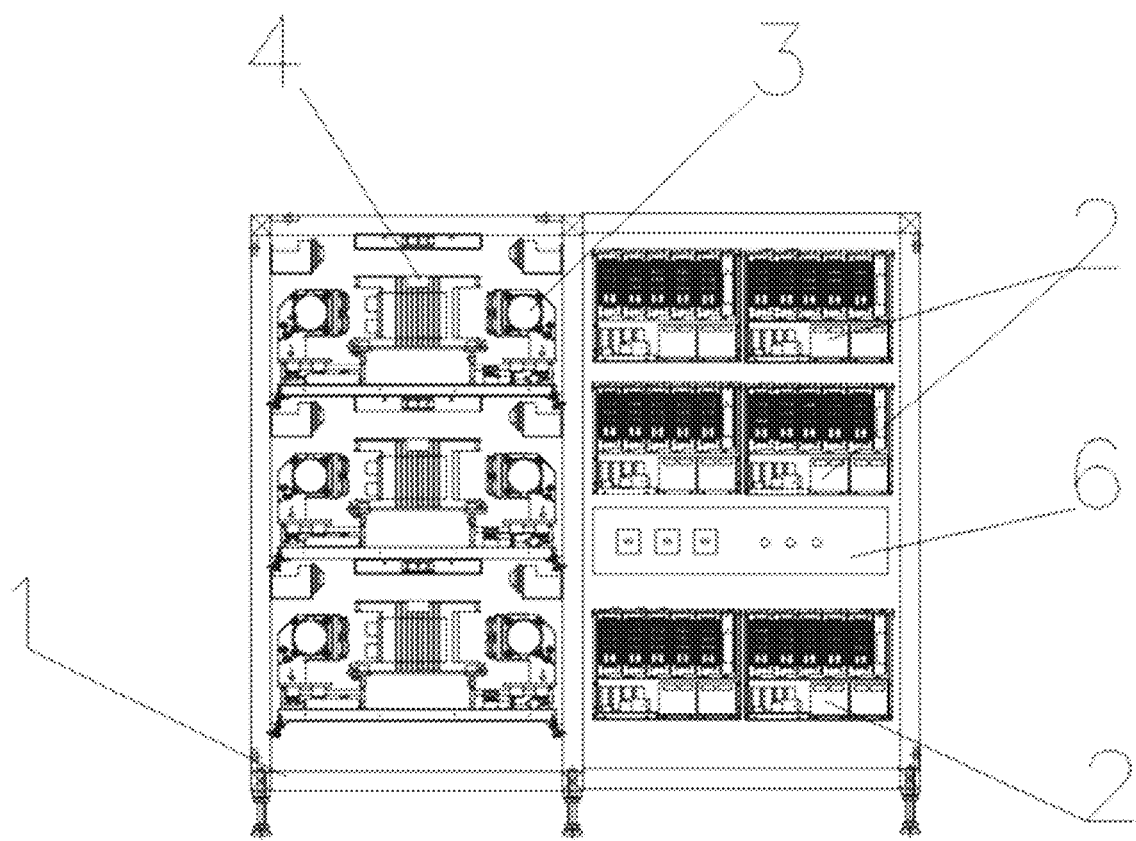
FIG. 1c is a first schematic diagram showing a left and right side pattern of the overall structure of a soft-package power battery formation capacity grading apparatus according to the present invention.
Figure 1D:
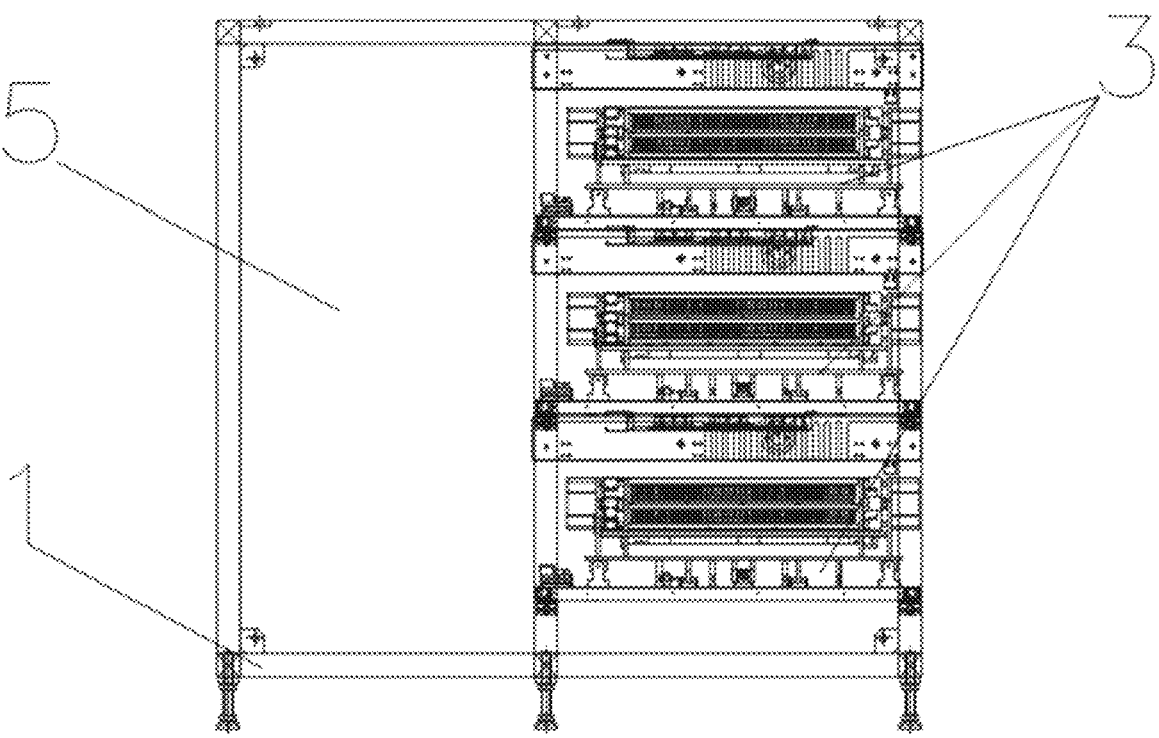
FIG. 1d is a second schematic diagram showing a left and right side pattern of the overall structure of a soft-package power battery formation capacity grading apparatus according to the present invention.
Figure 1E:
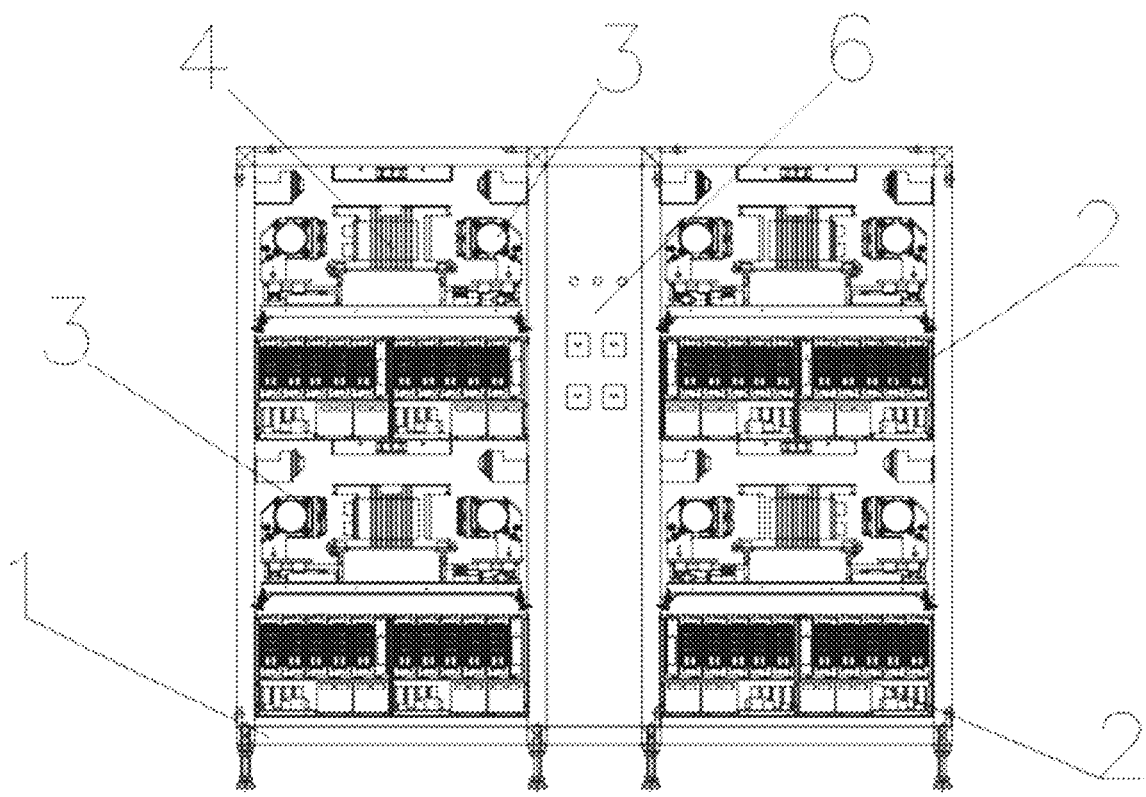
FIG. 1e is a first schematic diagram showing an upper and lower pattern of the overall structure of a soft-package power battery formation capacity grading apparatus according to the present invention.
Figure 1F:
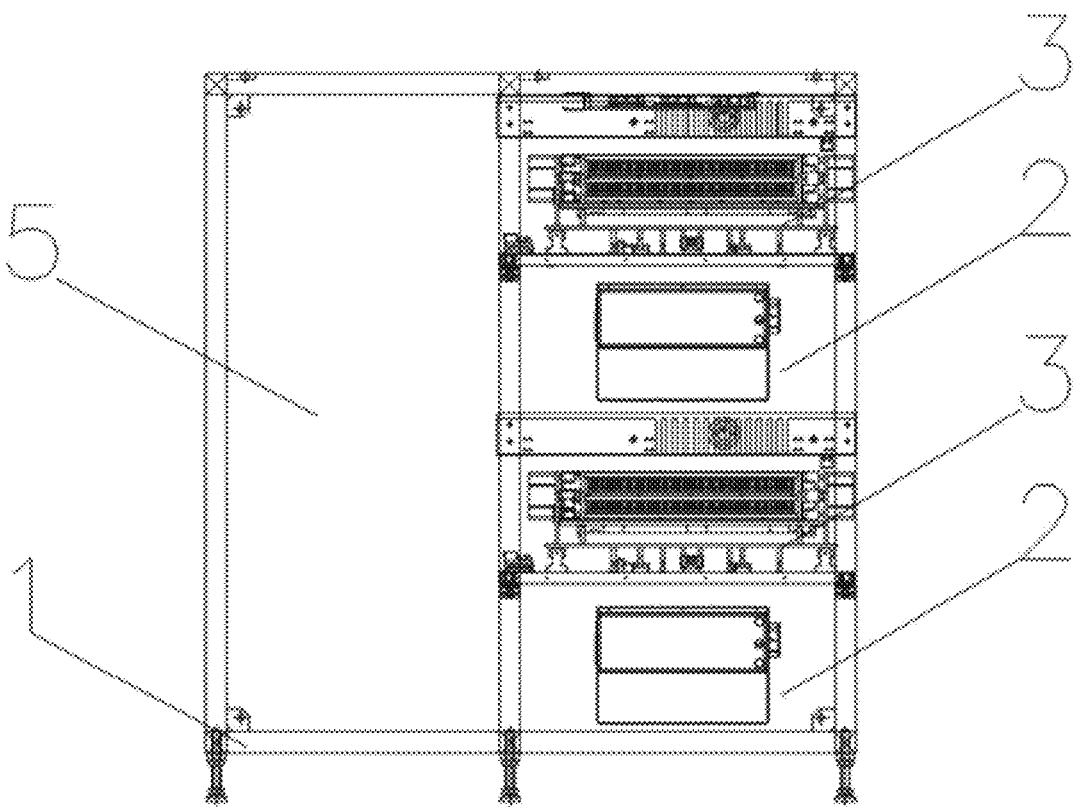
FIG. 1f is a second schematic diagram showing an upper and lower pattern of the overall structure of a soft-package power battery formation capacity grading apparatus according to the present invention.
Figure 2A:
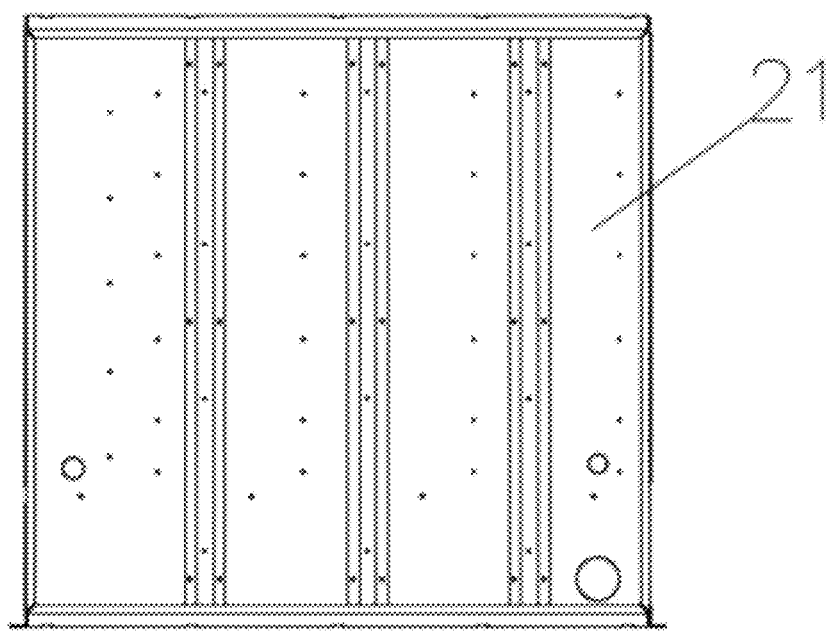
FIG. 2a is a schematic diagram showing the external structure of a condition-variable charge and discharge power box according to the present invention.
Figure 2B:
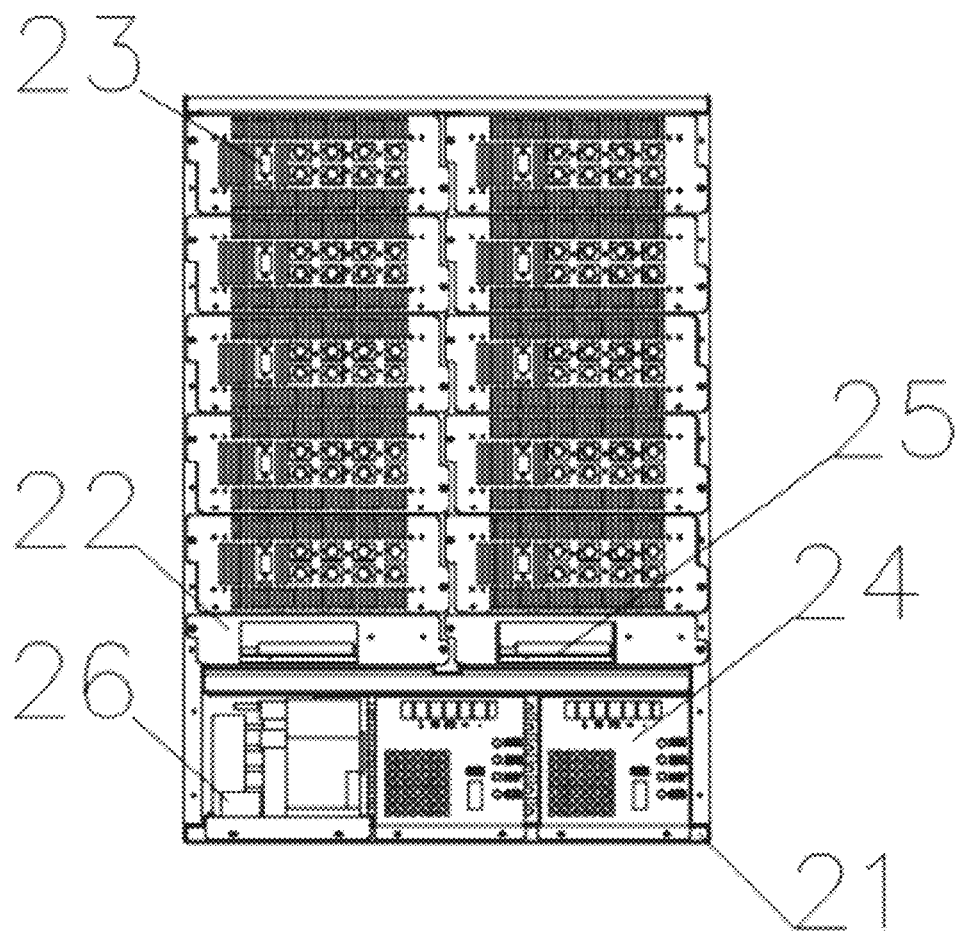
FIG. 2b is a schematic diagram showing the internal structure of a condition-variable charge and discharge power box according to the present invention.
Figure 2C:
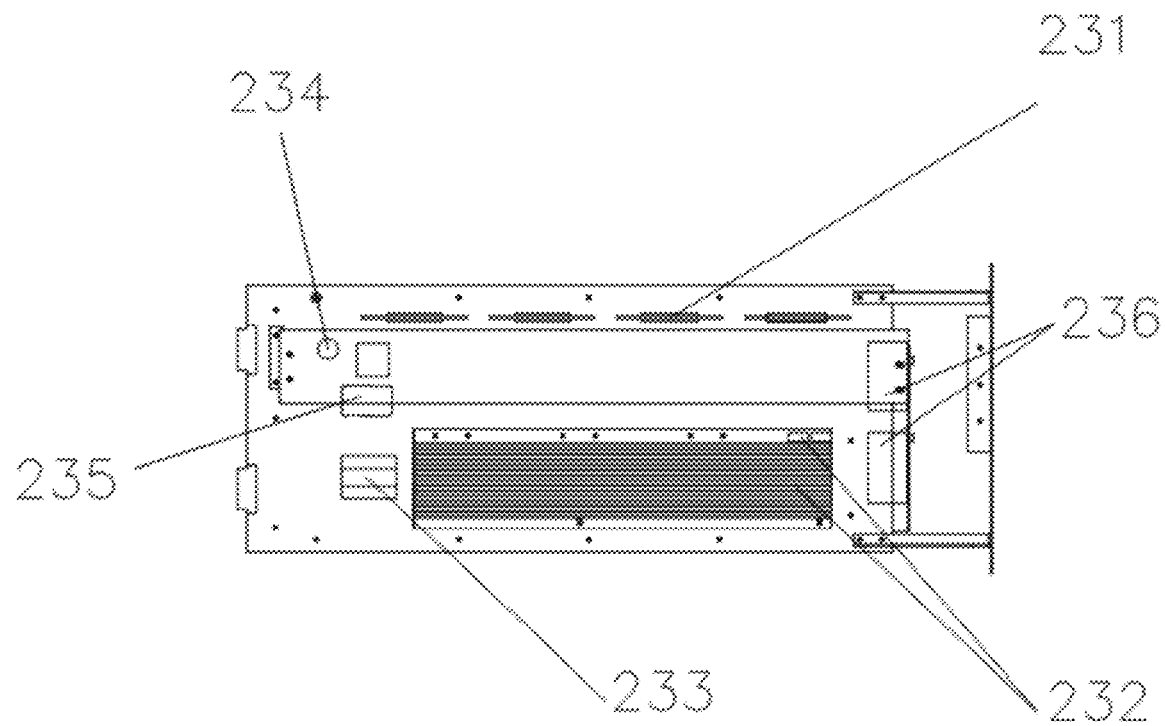
FIG. 2c is a schematic diagram showing the structure of a drive power board of a condition-variable charge and discharge power box according to the present invention.
Figure 2D:
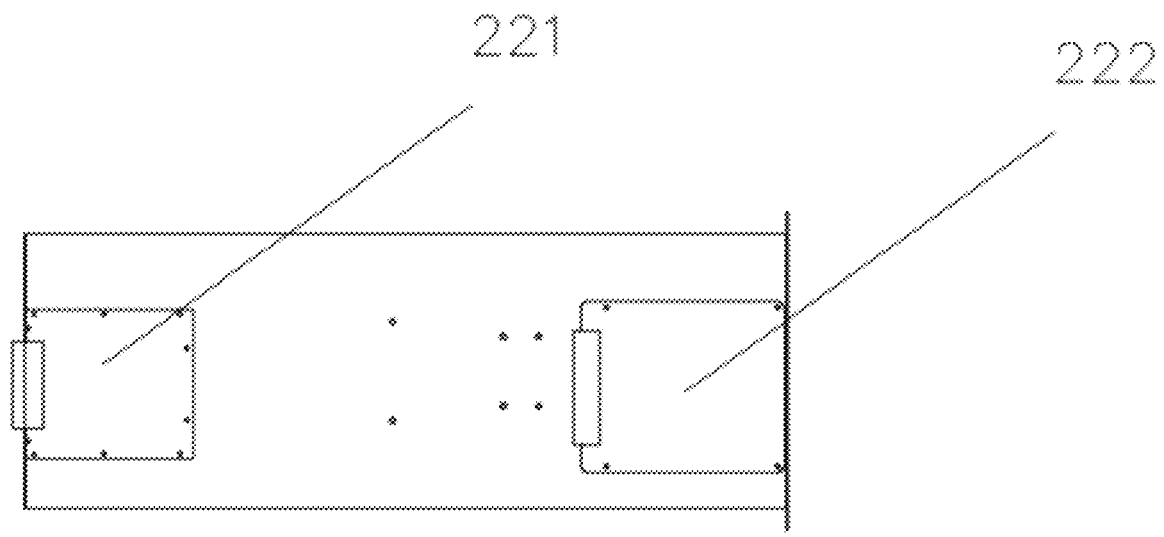
FIG. 2d is a schematic diagram showing the structure of a DSP control board of a condition-variable charge and discharge power box according to the present invention.
Figure 2E:
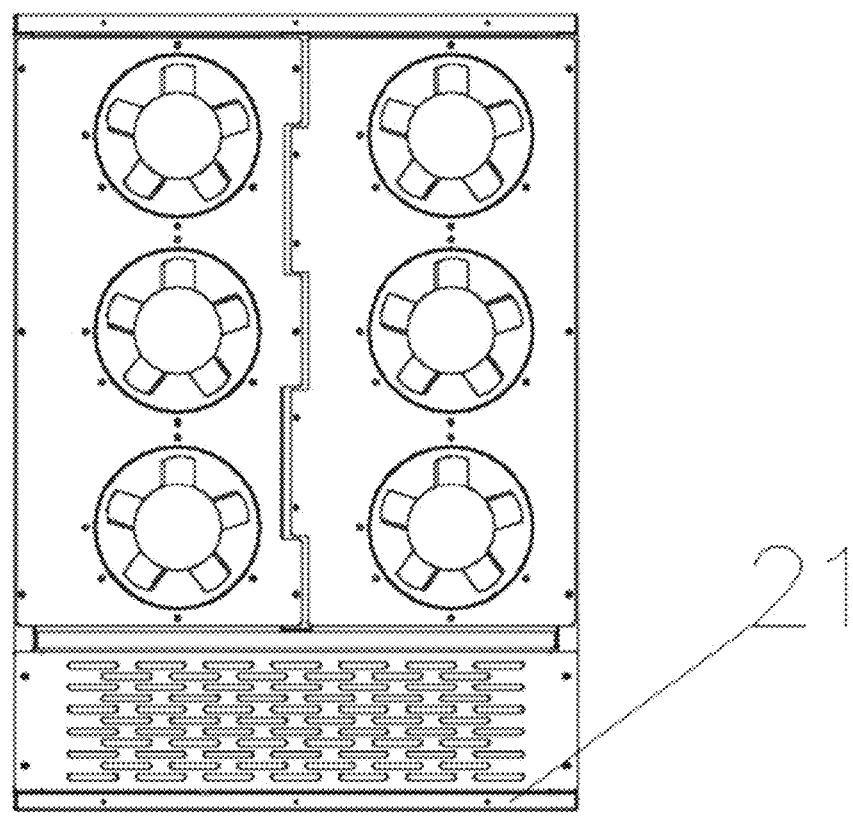
FIG. 2e is a schematic diagram showing the structure of a cooling fan of a condition-variable charge and discharge power box according to the present invention.
Figure 3A:
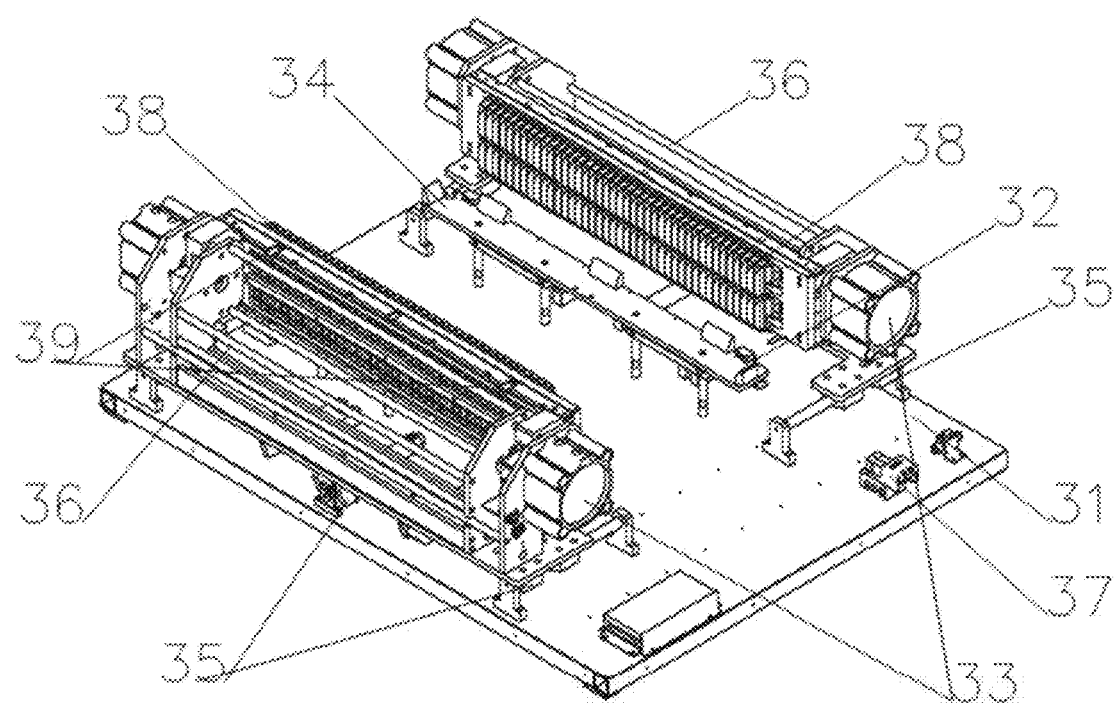
FIG. 3a is a schematic diagram showing the structure of a battery formation capacity-grading clamping movement mechanism according to the present invention.
Figure 3B:
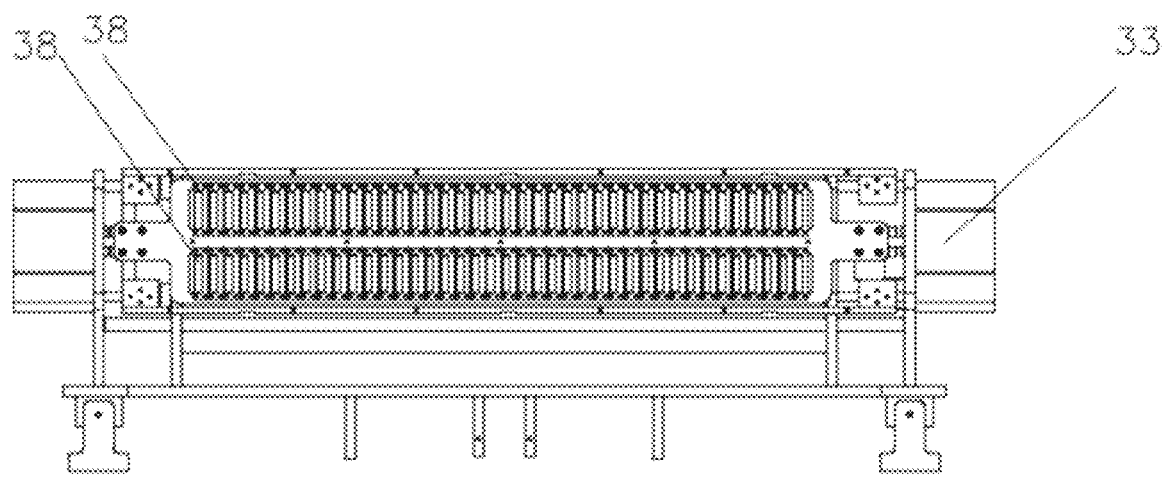
FIG. 3b is a schematic diagram showing the structure of two layers of lug clamps of a battery formation capacity-grading clamping movement mechanism according to the present invention.
Figure 4A:
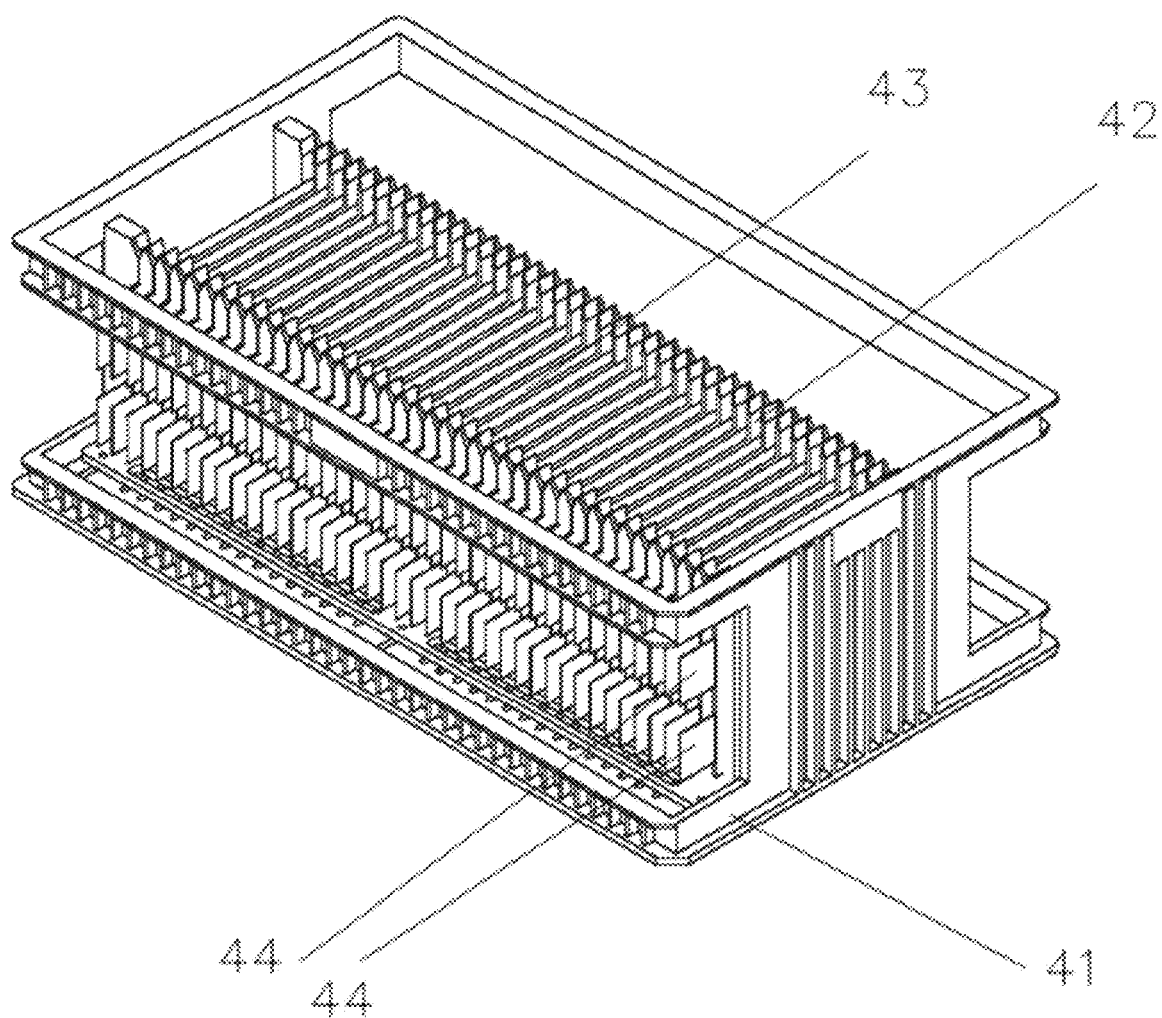
FIG. 4a is a schematic diagram showing the structure of a tray for a battery with single-sided lugs according to the present invention.
Figure 4B:
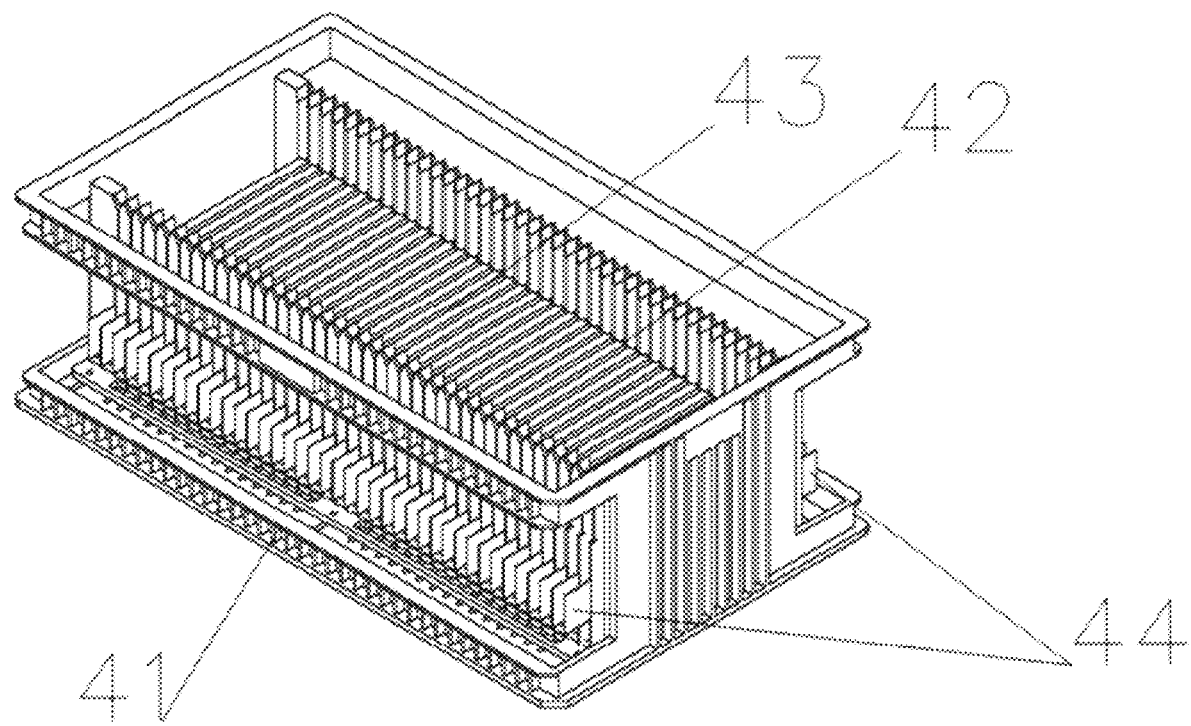
FIG. 4b is a schematic diagram showing the structure of a tray for a battery with double-sided lugs according to the present invention.
Figure 5A:
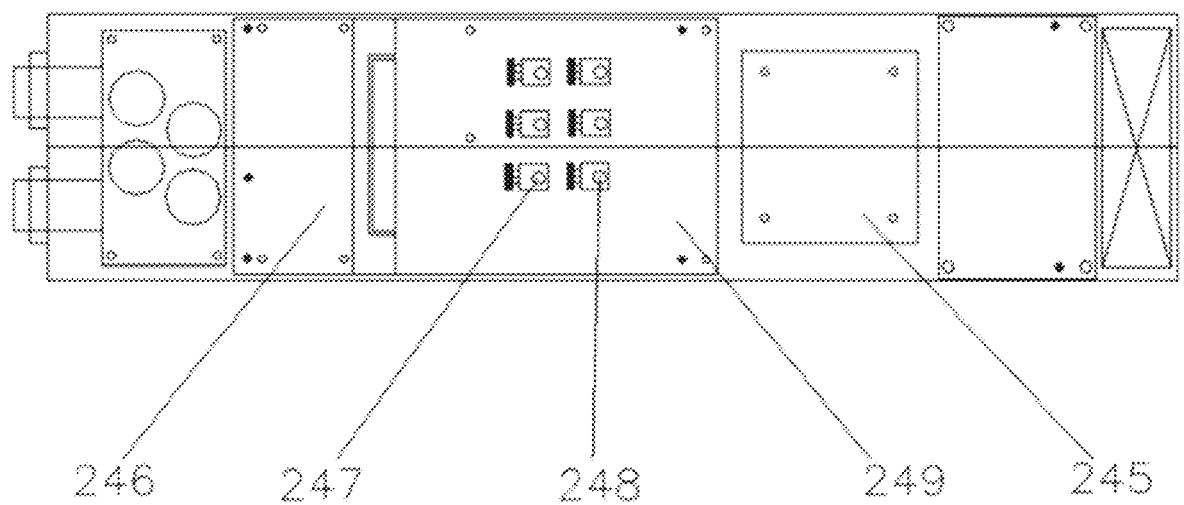
FIG. 5a is a schematic diagram showing the internal structure of a power inverter according to the present invention.
Figure 5B:
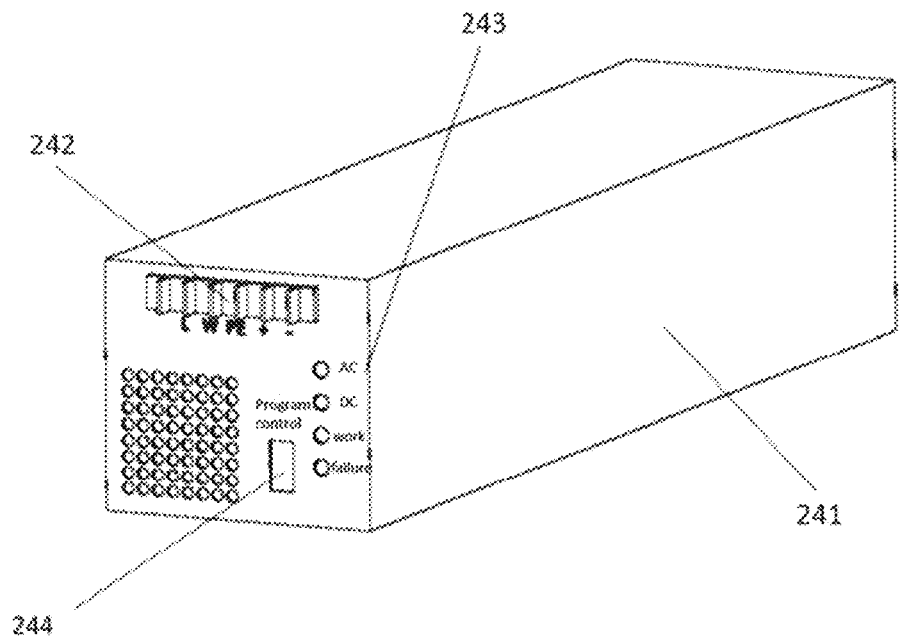
FIG. 5b is a schematic diagram showing the external structure of a power inverter according to the present invention.
Figure 6:
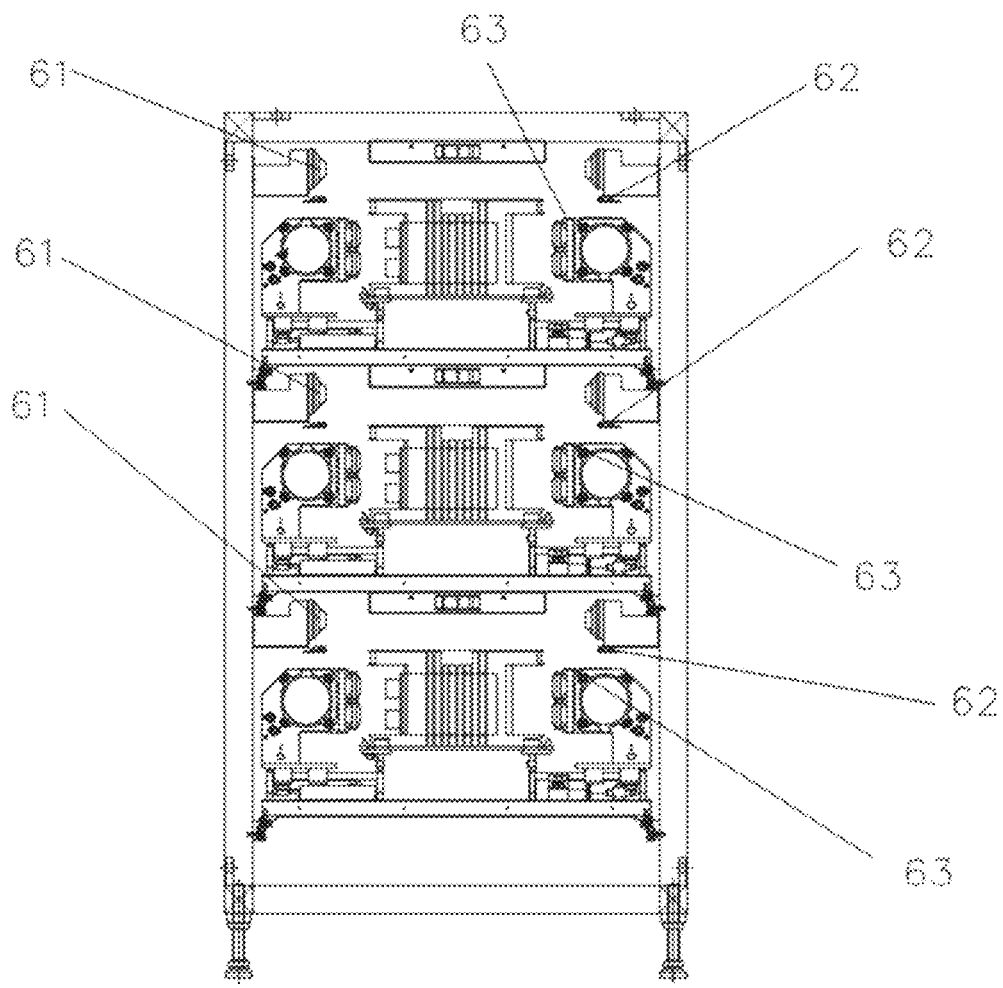
FIG. 6 is a schematic diagram of a safety protection sensor assembly according to the present invention.

Referring to FIGS. 1 to 6, the discharge energy recovery and formation capacity grading apparatus for a soft-package power battery comprises a rack 1, a condition-variable charge and discharge power box 2, a battery formation capacity-grading clamping movement mechanism 3 for clamping positive and negative electrode lugs of the soft-package power battery, a battery tray 4, a movement mechanism control assembly, a safety protection sensor assembly 6, and a battery charge and discharge capacity-grading control mechanism arranged in a chief controller, where the condition-variable charge and discharge power box 2, the battery formation capacity-grading clamping movement mechanism 3, the battery tray 4, the movement mechanism control assembly, and the safety protection sensor assembly 6 are all controlled by the battery charge and discharge capacity-grading control mechanism arranged in the chief controller outside the rack; and the condition-variable charge and discharge power box 2 is electrically connected with the battery formation capacity-grading clamping movement mechanism 3.

In the discharge energy recovery and formation capacity grading apparatus for soft-package power battery, a apparatus maintenance passage 5 is provided, in which an upper end of the apparatus maintenance passage 5 extends to the top of the rack, and a lower end extends to the bottom of the rack, for climbing by a maintenance personnel to maintain the mechanisms inside the rack.

The condition-variable charge and discharge power box 2 comprises a power chassis 21, and an electronic circuit, a DSP control board 22, a drive power board 23, an auxiliary working power 26, and a interface communication board 25 in communication connection with the battery charge and discharge capacity grading control mechanism arranged in the power chassis 21, where the electronic circuit, the drive power board 23, the auxiliary working power 26, and the interface communication board 25 are respectively connected to the DSP control board 22, the DSP control board 22 is connected to the battery charge and discharge capacity grading control mechanism via the interface communication board 25; and the electronic circuit comprises a DC/DC power supply enabling bidirectional current flow for charging and discharging a single-cell lithium ion battery, a safety protection reference resistor, a charge and discharge constant-current control loop subjected to precise control, a charge and discharge constant-voltage control loop, and a main-reference and fine-tune-reference combiner circuit.

The drive power board 23 comprises a multi-channel PWM DC/DC control module 231, a MOS power tube and heat sink 232, a DC/DC transformer 233, a capacitor 234, an inductor 235, and a drive power board cooling fan 236, where the multi-channel PWM DC/DC control module 231 is respectively connected to the MOS power tube and heat sink 232, the DC/DC transformer 233, the capacitor 234, the inductor 235, and the drive power board cooling fan 236.

A power inverter 24 is respectively connected to the power grid and an input of the DC/DC module, to convert the current from the power grid from AC to DC to charge the battery or to convert the discharge current of the battery from DC to AC to feed back to the power grid The power inverter 24 comprises a casing 241, a power input and output terminal block 242, a programmed status button 244, a working status indicator 243 arranged outside the casing, and a DSP chip board 246, an IGBT main power module 247, an IGBT power tube assembly 248, a power control circuit assembly 249, and a filter inductor 245 arranged inside the casing 241, where the DSP chip board is respectively connected to the programmed status button, the IGBT main power module, the IGBT power tube assembly, the power control circuit assembly and the filter inductor.

The battery formation capacity-grading clamping movement mechanism 3 comprises a bottom plate 31, lug clamps 38 for clamping the positive and negative electrode lugs of the soft-package power battery, a lug clamp compressing cylinder member 33 for bring the electrode lug of the battery into contact connection with the lug clamp, a battery tray holder 34 for supporting the battery tray, a horizontally moving cylinder member 35 of the lug clamp compressing member for moving the lug clamp to the position of the electrode lug of the battery, a bundled wire member 36, and a pneumatic control member 37 coupled to the battery formation capacity-grading control mechanism, arranged on the bottom plate 31, where the lug clamp 38, the lug clamp compressing cylinder member 33, the horizontally moving cylinder member 35, and the bundled wire member 36 are all controlled by the pneumatic control member 37, and the bundled wire member 36 is electrically connected to the drive power board 23 of the charge and discharge power box 2. A plurality of drive power boards 23 are disposed in the power chassis 21, and each of the driving power boards 23 has a plurality of charge and discharge circuits connected to the power inverter 24. When the battery is charged, the circuitry of the drive power board 23 obtains the current AC/DC from the power inverter 24; and when the battery is discharged, the circuitry of the drive power board 23 feeds the current DC/AC to the power inverter, thereby creating a function of energy recovery from the discharge circuitry. The bottom plate 31 is a reference base member of the entire clamping movement mechanism 3, the battery tray 4 is placed and positioned on the battery tray holder 34, the lug clamp compressing cylinder members 33 are driven by the horizontally moving cylinder members 35 to allow the left and right clamp probe members to move in parallel to the center of the battery tray 4, such that the positive and negative electrode lugs of the battery are located in the lug clamps 38, and then the lug clamps are compressed by the lug clamp compressing cylinder member 33, so that the contact impedance is as small as possible. The bundled wire member 36 is connected to the condition-variable charge and discharge power box 2, to achieve the charge and discharge function. The lug clamp compressing cylinder members 33 at both sides of the bottom plate 31 are fitted with an upper and lower layer of lug clamps 38 on the side facing the battery tray holder 34, for adapting to batteries of single-sided lugs and double-sided lugs.

The battery tray 4 further comprises a base 41, and a tray lining 42 arranged on the base. The surface of the tray lining 42 of is provided with several sites for placement of the soft-package power battery 43 that match the shape and size of the soft-package power battery 43; and the number of batteries placed can be changed by replacing the tray lining, which may be for example, 20, 25, 36, 48, and 64, etc. The soft-package power battery 43 is vertically positioned at the sites for placement, and the electrode lugs 44 extend out to fit with the lug clamps 38 of the clamping movement mechanism 3. The battery tray 4 is a molded stackable circulating box of flame retardant material. The electrode lugs 44 of the battery extend out through the left and right holes of the tray 4 to fit with the lug clamps of the battery formation capacity-grading clamping movement mechanism.

The battery tray further comprises a base, a tray lining arranged on the base, and an ID number for process management of the soft pack power battery.

The charge current, discharge current, maximum charge voltage, discharge cut-off voltage, and charge and discharge time of the battery are controlled by the chief controller over the power converter. The battery formation capacity-grading control mechanism, specially controlled by a chief controller, sets the formation capacity-grading conditions for the lithium ion battery and sends them to the DSP control board in the charge and discharge power box. Then the DSP control board executes the process constraint conditions of charge and discharge time limit, voltage limit, and current limit, collects the voltage and current signals from each battery, and transmits the signal data to the chief controller. Special control software for the chief controller analyzes and saves the received data, to form a lithium ion battery formation capacity-grading database. Such data is used as a basis for determining battery performance. One chief controller can process data for many batteries simultaneously.

The safety protection sensor assembly comprises a smoke alarm sensor 61, a position thru-beam sensor 62 for detecting the entry status of the battery tray and indicating the battery tray enclasping cylinder member to motion when the battery tray is in a right position, and a temperature sensor 63 for detecting the temperature of the battery inside the battery tray, mounted over the top of the battery formation capacity-grading clamping movement mechanism. Through the transmission of abnormal signals, the function of stopping the operation, alarming, and cutting off the power of the apparatus during abnormal operation can be realized. When the battery is overheated and smokes, the fire alarming information is transmitted, and the DSP control board and the pneumatic control member loosen the battery tray enclasping control member and loosen the lug clamp compressing cylinder member, to allow them to move horizontally and quickly to the initial positions, so that the battery can be conveniently removed for safe handling. The position thru-beam sensor indicates the battery tray enclasing cylinder member to motion after detecting that the battery tray is in a right position.

The special control software for formation capacity grading enables transmission in the chief controller or in a single chip microcomputer via a specific communication interface. The system works in a master-slave mode and is suitable for a distributed control network system.

The software for formation capacity-grading has a time limit, voltage limit, and current limit condition for termination of each process step. The charge mode can be selected from constant-current charge, constant-voltage charge, constant-current discharge, and sleep. The charge and discharge current is set between 10 A and 150 A, the charge and discharge voltage is set between 0.5V and 5V, the time of each step can be set, and a dynamic curve of the formation capacity grading process for each battery can be drawn in real time, including a voltage/time line, a current/time curve, a capacity/time curve, and an energy/time curve, and a list of data can be formed to enable the capacity grading.

The description in the embodiments of the present specification is merely illustrative of the implementation forms of the inventive concept, and the scope of protection of the present invention should not be construed as being limited to the specific forms stated in the embodiments. The scope of protection of the present invention also includes equivalent technical means suggested to those skilled in the art in accordance with the inventive concept.

What is claimed is:

1. A discharge energy recovery and formation capacity grading apparatus for a soft-package power battery, comprising a rack, a condition-variable charge and discharge power box arranged on the rack, a battery formation capacity-grading clamping movement mechanism for clamping positive and negative electrode lugs of the soft-package power battery, a battery tray for placing the soft-package power battery, a movement mechanism control assembly for controlling the movement of the battery formation capacity-grading clamping movement mechanism, a safety protection sensor assembly, and a battery formation capacity-grading control mechanism, wherein the condition-variable charge and discharge power box, the battery formation capacity-grading clamping movement mechanism, the battery tray, the movement mechanism control assembly, and the safety protection sensor assembly are all in signal connection with the battery formation capacity-grading control mechanism; and a power transmission end of the charge and discharge power box is electrically connected with a power transmission end of the battery formation capacity-grading clamping movement mechanism.

2. The discharge energy recovery and formation capacity grading apparatus for a soft-package power battery according to claim 1, wherein the charge and discharge power box comprises a power chassis, an electronic circuit, at least one drive power board, a DSP control board, an auxiliary working power, a power inverter with bidirectional flow and conversion capability between AC and DC, a safety protection control assembly and an interface communication board, wherein the electronic circuit, the drive power board, the DSP control board, the auxiliary working power, and the power inverter are all arranged in the power chassis; the electronic circuit, the drive power board, the auxiliary working power and are respectively connected to the DSP control board; the DSP control board is in bidirectional signal connection with the battery formation capacity-grading control mechanism via the interface communication board; and a signal transmission end of the drive power board is in signal connection with a signal transmission port of the power inverter.

3. The discharge energy recovery and formation capacity grading apparatus for a soft-package power battery according to claim 2, wherein the electronic circuit comprises a DC/DC power supply enabling bidirectional current flow for charging and discharging a single-cell lithium ion battery, a safety protection reference resistor, a charge and discharge constant-current control loop subjected to precise control, a charge and discharge constant-voltage control loop, and a main-reference and fine-tune-reference combiner circuit.

4. The discharge energy recovery and formation capacity grading apparatus for a soft-package power battery according to claim 2, wherein the drive power board comprises a multi-channel PWM DC/DC control module, a MOS power tube and heat sink, a DC/DC transformer, a capacitor, an inductor, and a drive power board cooling fan, wherein the multi-channel PWM DC/DC control module is in signal connection respectively with the MOS power tube and heat sink, the DC/DC transformer, the capacitor, the inductor, and the drive power board cooling fan; and connection ports of the power inverter are respectively electrically connected to the power grid and an input of the multi-channel PWM DC/DC control module to convert the current from the power grid from AC to DC to charge the battery or to convert the discharge current of the battery from DC to AC to feed back to the power grid, that is, when the battery is charged, the circuitry of the drive power board obtains the current AC/DC from the power inverter; and when the battery is discharged, the circuitry of the drive power board feeds the current DC/AC to the power inverter, thereby creating a function of energy recovery from the discharge circuitry.

5. The discharge energy recovery and formation capacity grading apparatus for a soft-package power battery according to claim 4, wherein the power inverter comprises a casing, a power input and output terminal block, a programmed status button, a working status indicator, a DSP chip board, an IGBT main power module, an IGBT power tube assembly, a power control circuit assembly, and a filter inductor, wherein the power input and output terminal block, the programmed status button, and the working status indicator are all mounted on the surface of an operation area of the casing; the DSP chip board, the IGBT main power module, the IGBT power tube assembly, the power control circuit assembly, and the filter inductor are arranged inside the casing, corresponding signal transmission ports of the DSP chip board are respectively electrically connected to the programmed button, the IGBT main power module, the IGBT power tube assembly, the power control circuit assembly, and the filter inductor; a power input and output of the DSP chip board are electrically connected to the power grid via the power input and output terminal block; a signal input and output of the DSP chip board are electrically connected to an input of the multi-channel PWM DC/DC control module; and a signal indication output of the DSP chip board is electrically connected to the working status indicator, for indicating the working status of the power inverter.

6. The discharge energy recovery and formation capacity grading apparatus for a soft-package power battery according to claim 1, wherein the battery formation capacity-grading clamping movement mechanism comprises a planar aluminum plate; and lug clamps for clamping the positive and negative electrode lugs of the lithium ion battery, a battery tray enclasping cylinder member for enclasping and locking position of the battery tray, a lug clamp compressing cylinder member for bring the electrode lug of the batten into contact connection with the lug clamp, a battery tray holder for supporting the battery tray, a horizontally moving cylinder member of the lug clamp compressing member for moving the lug clamp to the position of the electrode lug of the battery, a bundled wire member, and a pneumatic control member coupled to the battery formation capacity-grading control mechanism, arranged on the planar aluminum plate, wherein the planar aluminum plate is horizontally disposed, two horizontally moving cylinder members are symmetrically arranged on the planar aluminum plate, movable ends of the two horizontally moving cylinder members are allowed to move in a direction facing or facing away from each other, the movable end of each of the horizontally moving cylinder member is fitted with the lug clamp compressing cylinder member, and a movable end of the lug clamp compressing cylinder member moves in a direction perpendicular to the direction of movement of the movable end of the horizontally moving cylinder member, a side of the lug clamp compressing cylinder member facing the battery tray holder is mounted with the lug clamp, and the lug clamp is capable of being axially compressed or stretched along the lug clamp compressing cylinder member, to achieve the compression of the electrode lug of the battery and the lug clamp while the two are in contact connection; the battery tray holder is arranged on the planar aluminum plate between the two lug clamps, and the battery tray holder is provided with the battery tray enclasping cylinder member; the lug clamp, the battery tray enclasping cylinder member, the lug clamp compressing cylinder member, the horizontally moving cylinder member of the lug clamp compressing member, and the bundled wire member are all in signal connection with a signal output of the pneumatic control member, and a signal input of the pneumatic control member is in signal connection with a corresponding signal output of the battery formation capacity-grading control mechanism, to achieve the control of the lug clamp, the battery tray enclasping cylinder member, the lug clamp compressing cylinder member, the horizontally moving cylinder member of the lug clamp compressing member, and the bundled wire member by the pneumatic control member; and the bundled wire member is electrically connected to the drive power board of the charge and discharge power box.

7. The discharge energy recovery and formation capacity grading apparatus for a soft-package power battery according to claim 6, wherein the battery tray comprises a base, an outer frame, and a tray lining, in which a bottom of the outer frame is fixed to the base, such that the outer frame and the base enclose a cavity for holding the soft-package lithium battery; two opposite sides of the outer frame are provided a hole for extending the electrode lug of the soft-package lithium battery out; the tray lining is laid on the surface of the base, and the surface of the tray lining is provided with a plurality of sites for placement of the soft-package power battery that match the shape and size of the soft-package power battery; the soft-package power battery is vertically positioned at the sites for placement, and the electrode lugs of the soft-package power battery is ensured to fit with the lug clamps of the battery formation capacity-grading clamping movement mechanism after extending out from the left and right sides.

8. The discharge energy recovery and formation capacity grading apparatus for a soft-package power battery according to claim 7, wherein an ID number for process management of the soft pack power battery is provided on the base of the battery tray.

9. The discharge energy recovery and formation capacity grading apparatus for a soft-package power battery according to claim 1, wherein the safety protection sensor assembly comprises a smoke alarm sensor mounted on the top of the battery formation capacity-grading clamping movement mechanism, a position thru-beam sensor for detecting the entry status of the battery tray and indicating the battery tray enclasping cylinder member to motion when the battery tray is in a right position, and a temperature sensor for detecting the temperature of the battery at the perimeter of the battery tray, wherein the smoke alarm sensor, the position thru-beam sensor, and the temperature sensor are all provided on the rack over the top of the capacity-grading clamping movement mechanism; and a signal output of the smoke alarm sensor, a signal output of the temperature sensor, and a signal output of the position thru-beam sensor are in signal connection respectively with a corresponding signal output of the battery formation capacity-grading control mechanism.

\* \* \* \* \*